United States Patent [15] 3,699,525
Klavins [45] Oct. 17, 1972

[54] USE OF CONTROL WORDS TO CHANGE CONFIGURATION AND OPERATING MODE OF A DATA COMMUNICATION SYSTEM

[72] Inventor: Aldis Klavins, Bridgeport, Conn.

[73] Assignee: Honeywell Information Systems, Inc., Waltham, Mass.

[22] Filed: Nov. 27, 1970

[21] Appl. No.: 93,229

[52] U.S. Cl. ....................340/172.5, 179/18 ES
[51] Int. Cl. ....................G06f 3/00
[58] Field of Search ....................340/172.5; 179/18 ES

[56] References Cited

UNITED STATES PATENTS

| | | | |
|---|---|---|---|
| 3,510,843 | 5/1970 | Bennett et al. | 340/172.5 |
| 3,331,055 | 7/1967 | Betz et al. | 340/172.5 |
| 3,571,806 | 5/1971 | Makie et al. | 340/172.5 |
| 3,308,439 | 3/1967 | Tink et al. | 340/172.5 |
| 3,419,852 | 12/1968 | Marx et al. | 340/172.5 |
| 3,528,060 | 9/1970 | Streif | 340/172.5 |

*Primary Examiner*—Harvey E. Springborn
*Attorney*—Fred Jacob and Edward W. Hughes

[57] ABSTRACT

A data communication system comprising a processor, a memory, a communications controller and a plurality of terminal devices utilizes control words to select the configuration and to select the operating mode of the communication system. This system uses peripheral control words stored in memory to select the number of bits in message characters which may be used in the data communication system, to select the baud rate of the message which is received and to select a synchronous or asynchronous mode of transmission.

11 Claims, 5 Drawing Figures

INVENTOR
ALDIS KLAVINS
BY Lloyd B. Guernsey
AGENT

USE OF CONTROL WORDS TO CHANGE CONFIGURATION AND OPERATING MODE OF A DATA COMMUNICATION SYSTEM

CROSS-REFERENCE TO RELATED APPLICATIONS

The parallel-to-series converter, the series-to-parallel converter and the select matrix shown in the present application are disclosed in a copending U.S. Pat. application by Ronald W. Blessin et al., filed Nov. 3, 1970, entitled "Data Communications Subchannel," which is assigned to the same assignee as the present invention.

The memory shown in the present application is disclosed in an issued U.S. Pat. No. 3,521,240, by David L. Bahrs et al. entitled, "Synchronous Storage Control Apparatus for a Multiprogrammed Data Processing System."

BACKGROUND OF THE INVENTION

The present invention pertains to data communication equipment and more specifically to data communication equipment which uses peripheral control words to control the configuration, the mode of transmission, the baud rate and the size of characters which can be used in the data communications equipment.

In the modern business world data communication systems are commonly used to process data which is developed at a plurality of locations that are often spaced many miles or many hundreds of miles apart. Data at each of these locations may be entered in a data communication system by a terminal device at each of these locations. These terminal devices convert the data from human readable form into binary form and transmit this data over wires or microwave relay systems from the terminal device to a communications controller which receives the data and transfers the received data to a data processor. The terminal devices generate a wide range of message code sets, character lengths, bit rates, message formats, communication line disciplines and modes of transmission (synchronous or asynchronous). The wide variety of these terminal devices and the fact that there is a general lack of standardization of message codes sets, character lengths, bit rates, message formats, communication line disciplines and mode of transmission in the industry presents an enormous number of problems to the designer of data communications equipment. The data communications equipment must be designed to interface with a wide variety of different types of these terminal devices and should be constructed so that additional devices can be added or the terminal devices connected to the date communication systems can be changed at the desire of the customers.

It is desirable to provide a communications controller which is sufficiently flexible to be connected to a wide variety of types of terminal devices having a wide variety of speeds of transmission of message characters or baud rates, different sizes of message characters, and different modes of transmission. Many prior art systems are designed in modular form with each of the many available module options intended to interface with a limited and specific type of terminal devices. Each of these modules provides compatibility with a specific terminal device or with a family of terminal devices. Once a customer's configuration is known, the appropriate optional modules can be connected to a common control module in the data communication system. This use of optional modules requires a design of, and a capability of manufacturing, testing and maintaining a number of different types of modules. The hardware in each of the line modules may be different so that it is not possible to use common logic to perform functions which differ among the various line modules and efficiency of design may be sacrificed.

Other prior art systems may use switches, patch plugs or boards, and/or wiring options so as to permit custom configuration of the hardware or hardware modules to obtain compatibility with various terminal devices. Thus, the specific configuration of terminal devices in the field will be different and will probably be in a continual state of flux due to changing customer requirements. This changing of plug boards and hardware modules creates problems in maintaining the data communication system, in various customer installations and in creating software for the purpose of testing and diagnosing the data communication system. It is very difficult to construct a comprehensive, yet invarient software test package, for a system which has many possible configurations and in which the configurations may change from time to time. Hence, it is often necessary to customize the test and diagnostic package for each of the customer sites initially, and then make further changes each time the system is changed or reconfigured.

The instant invention overcomes the disadvantages of the prior art by providing a data communication system which uses a plurality of peripheral control words and decoding logic to select a baud rate of the incoming message characters, to determine if synchronous or asynchronous transmission is to be used, to determine the size of message characters which can be transmitted and to provide commands to the terminal devices. When the terminal devices at the end of the transmission line are changed the peripheral control words stored in the memory of the data communication system can be changed to cause the baud rate to be changed, to cause the length of the message characters to be changed, or to change the mode of transmission from synchronous to asynchronous transmission, etc. This means that a large number of terminal devices can be accommodated by the data communication system and that these devices can be changed without the change of any hardware in the system. All that is required is that a new peripheral control word be stored in the memory of the data communication systems and used to reconfigure the communications controller.

It is, therefore, an object of this invention to provide a new and improved system for selecting the length of message characters which can be received by a data communications system.

Another object of this invention is to provide a new and improved system for selecting the baud rate of the message characters which can be received by a data communication system.

A further object of this invention is to provide a system for determining if synchronous or asynchronous transfer of message characters is used between the communications controller and the terminal devices.

Still another object of this invention is to provide a new and improved system for using peripheral control words to select a synchronizing character which may be used in the data communication system.

A further object of this invention is to provide a new and improved system for using peripheral control words to select the number of stop bits which may be used with each character in the data communication system.

Another object of this invention is to provide a new and improved system for using peripheral control words to resynchronize a character counter with message characters being received by the communications controller.

SUMMARY OF THE INVENTION

The foregoing objects are achieved in accordance with one embodiment of the present invention by employing a data communication system that utilizes a plurality of peripheral control words and decoding logic to configure the controller and the subchannels. These peripheral control words are stored in memory of the data communication system and are retrieved upon signal from the program under execution in the system and are stored in the registers in the communications controller and in the subchannels. These peripheral control words are decoded and used to select the baud rate which will be used by the terminal device, to select the length of the message characters which can be received and to select the mode of transmission which can be used. These peripheral control words can also be used to cause the controller to resynchronize with the message characters being received and to perform other control functions.

Other objects and advantages of this invention will become apparent from the following description when taken in connection with the accompanying drawings.

DESCRIPTION OF THE PREFERRED EMBODIMENT

Since the present invention pertains to data processing and to data communication techniques, a description thereof can become very complex; however, it is believed unnecessary to describe all of the details of the data communication system to completely describe the present invention. Therefore, most of the details that are relatively well known in the art will be omitted from this description. Even though details will be eliminated a basic description will be given of the entire system to enable one skilled in the art to understand the environment in which the present invention is placed. Accordingly, reference is made to FIG. 1 showing a simplified block diagram of a data communication system which uses the present invention.

Figure 1:
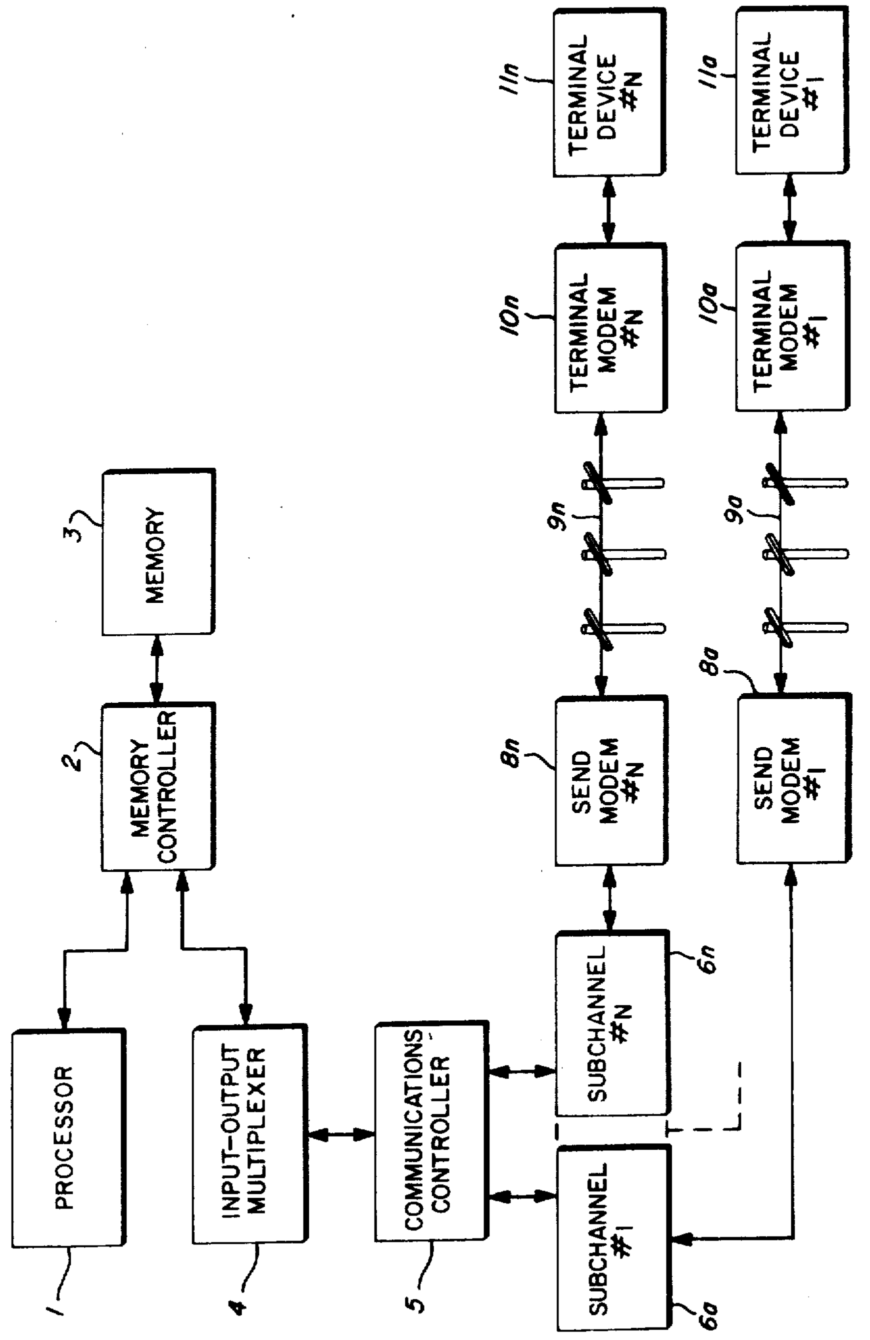
FIG. 1 is a simplified block diagram of a data communications system in which the present invention may be used.

The data communication system shown in FIG. 1 includes a data processor 1, a memory controller 2, a memory device or memory 3, an input/output multiplexer 4, a communications controller 5 having a plurality of subchannel 6*a*–6*n*, and a plurality of terminal devices 11*a*–11*n*. The data processor 1 shown in FIG. 1 manipulates data in accordance with instructions of a program. The processor receives an instruction, decodes the instruction and performs the operation indicated thereby. The operation is performed upon data received by the processor and temporarily stored thereby during the operation. The series of instructions are called a program and include decodable operations to be performed by the processor. The instructions of the program are obtained sequentially by the processor and together with the data to be operated upon, are stored in the memory device. The memory device 3 shown in FIG. 1 may form many of several well known types; however, most commonly the main memory is a random access coincident-current type having discrete addressable locations each of which provides storage for a word. The word may form data or instructions and may contain specific fields useful in a variety of operations. Normally, when the processor is in need of data or instructions it will generate a memory cycle and provide an address to the memory. The data or words stored at the address location will subsequently be retrieved from memory and provided to the data processor 1.

A series of instructions comprising a program is usually "loaded" into the memory at the beginning of the operation and thus occupies a "block" of memory which normally must not be disturbed until the program has been completed. Data to be operated upon by the processor in accordance with instruction of the stored program is stored in the memory and is retrieved and replaced in accordance with the binary coded instructions.

Communication with the data processing system usually takes place through the media of input/output devices such as magnetic tape handlers, paper tape readers, punch card readers, and remote terminal devices. To control the receipt of information from input/output devices and to coordinate the transfer of information to and from such devices, an input/output control means is required. Thus an input/output controller or input/output multiplexer is provided and connects the data processing system to the variety of input/output devices. The input/output multiplexer coordinates the information flow to and from the various input/output devices and also awards priority when more than one input/output device is attempting to communicate with data processing system. Since input/output devices are usually electromechanical in nature and necessarily have operating speeds which are much lower than the remainder of the data processing system, the input/output multiplexer provides buffering for temporary storage to enable the processing system to proceed at its normal rate without waiting for the time consuming communication with the input/output device.

Binary information which may be supplied from the memory to the subchannel 6a–6n, is converted by one of the send modems 8a–8n into modulated information which may be sent over telephone lines 9a–9n to one of the terminal modems 10a–10n. A terminal modem converts a modulated information into binary information for use by a corresponding one of the terminal devices 11a–11. Binary information which is generated by one of the terminal devices 11a–11n is converted by one of the terminal modems 10a–10n into modulated information which is sent over the telephone lines to a corresponding send modem 8a–8n, which converts information into binary information again for use by a corresponding one of the sub-channels 6a–6n. The send modems and the terminal modems may either receive modulated information and convert the modulated information into binary information or they may receive binary information and convert it into modulated information.

The input/output multiplexer shown in FIG. 1 may have a plurality of input/output devices connected to the input/output multiplexer or input/output controller. The communications controller 5 shown in applicant's FIG. 1 appears to the input/output multiplexer 4 to be an input/output device, but this communication controller in turn controls a plurality of subchannels which may be connected to terminal devices.

For a complete description of the processor of FIG. 1 and the instant invention which is embodied in such a processor, reference is made to the above U.S. Pat. No. 3,413,613 issued to David L. Bahrs et al. More particularly, FIGS. 20–38 of the drawing; column 10, line 67, to column 32, line 21 of U.S. Pat. No. 3,413,613 are incorporated herein by reference and made a part of the instant patent application.

Memory device 3 may be of the type disclosed in an issued U.S. Pat. No. 3,521,240 by David L. Bahrs, John F. Couleur, and Albert L. Beard entitled, "Synchronous Storage Control Apparatus for a Multiprogrammed Data Processing System."

A more complete description of the operation of a data communication system is disclosed in a copending application by James A. Kennedy, Aldis Klavins and Robert J. Koegel, bearing Ser. No. 50,792 and entitled, "Data Communications System." This application was filed on June 29, 1970.

Figure 2:
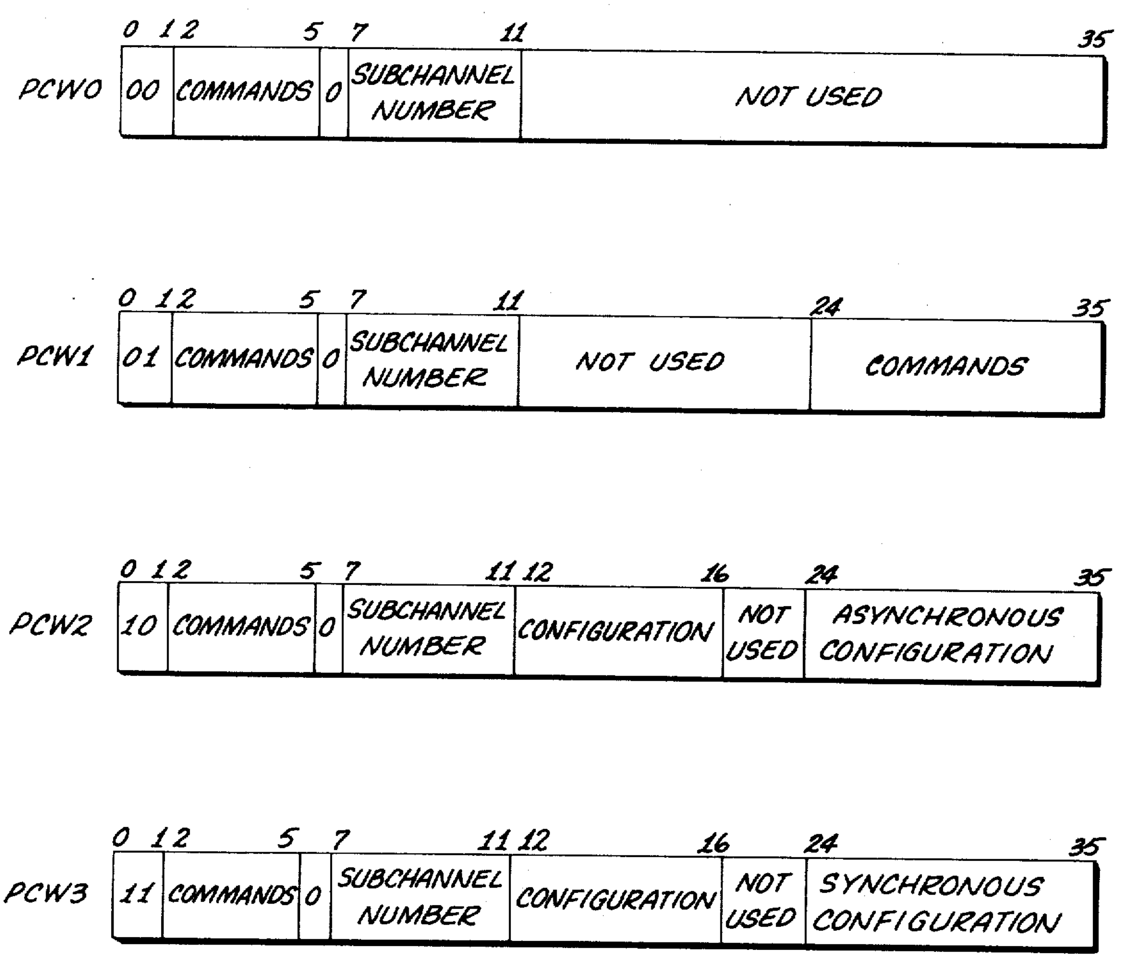
FIG. 2 is a diagram of alphanumeric control words used in the communications system.

FIG. 2 illustrates peripheral control words or PCW's that are used by the present invention to select the baud rate of incoming characters, to determine if the synchronous or asynchronous mode of transmission is used, to determine the size of message characters which can be transmitted in the system and to provide commands to the terminal devices. PCW's can also be used to generate and to check parity, control the transmission of data and to detect the end of a message. Four general types of PCW's are shown in FIG. 2 with the four different types being identified by the subscript 0–3. These four types are identified in the field containing the bits 0 and 1. These bits 0 and 1 are also used to route each of the peripheral control words to a particular portion of the communications controller 5 or to a portion of the subchannel which is connected to the communications controller. The PCW0 contains a binary 0 in both the 0 bit and in the 1 bit. These binary 0's in the 0 and 1 bit cause the communications controller to read only the field contained in bits 2–5 for commands and to read bits 7–11 for the subchannel number.

The peripheral control word PCW1 contains a binary 1 in the identifying field which causes the communications controller to read the command bits 2–5, bits 7–11, which contain the subchannel number and bits 24–35 which also contain commands. When a PCW1 is received by the communications controller, the controller passes the entire field of bits 24–35 to the subchannel which stores these bits in its command register.

The PCW2 contains commands in bits 2–5, contains the subchannel number in bits 7–11, contains the configuration in bits 12–16, and contains the asynchronous configuration in bits 24–35.

The PCW3 contains commands in bits 2–5, contains the subchannel number in bits 7–11, contains the configuration in bits 12–16 and contains the synchronous configuration in bits 24–35.

The following are examples of the binary coded command field (bits 2–5) of PCW0 and PCW1. The left column shows the octal coding of the command field and the right column shows the command which is represented by this binary coding in bits 2–5.

| Octal | Binary Coded CommandField for PCW0 and PCW1 |
|---|---|
| 0 | No command sent. This is required when commands are sent in PCW1 bits 24–35 to the subchannel but no commands in bits 2–5 are sent to the communications controller. |
| 1 | Send input status. Requires specified subchannel to store input status. |
| 2 | Send output status. Requires specified subchannel to store output status. |
| 3 | Send configuration status. Requires subchannel to store configuration status. |
| 4 | Set mask. The specified subchannel is masked or shut down and no further activity is permitted until it is unmasked. |
| 5 | Reset mask. The specified subchannel is unmasked and permitted to resume normal activity. |

This illustrates only a few of the binary coded commands which can be sent to the communications controller and to the sub-channels by PCW0 and PCW1. It is possible to send many other commands in these bits 2–5 of the PCW0 and PCW1. Commands sent by the PCW1 to the subchannel in bits 24–35 may cause the subchannel to be conditioned to receive a message, to send a message, to cause terminal devices to be turned on or to perform many other functions on the terminal device.

In the PCW2 and PCW3 bits 2–5 are be used to determine the number of bits in message characters which may be transmitted. For example, an octal number 14 in bits 2–5 indicates a five-bit character is being used, an octal number 15 indicates a six-bit character, etc. Bits 12–16 in the PCW2 and PCW3 are be used to determine if parity is to be generated for characters being transmitted; to determine if parity is to be checked for characters being received; to sense parity; to use the table function for control and disposition of characters; and to cause an alternate data control word to be used.

A PCW3 is employed when a synchronous mode of transmission is to be used. In the PCW3 bits 24–35 are be used to determine the baud rate of the communications controller and the terminal devices when the terminal devices are in an asynchronous mode. For example, baud rates between 110 and 1800 are commonly available for use in the data communications system shown in FIG. 1. Bits 24–35 are be used to select the synchronizing characters which synchronize timing signals with incoming message characters.

The operation of the communications controller shown in FIG. 3 and the subchannel shown in FIG. 4 will now be described in connection with the PCW's shown in FIG. 2 and the data communication system shown in FIG. 1. FIGS. 4*a* and 4*b* are drawn to be placed side by side. Leads from the right side of FIG. 4*a* are connected to leads from the left side of FIG. 4*b*. The PCW which is to be utilized by the communications controller is retrieved from memory 3 by the memory controller 2 (FIG. 1) and transferred through input/output multiplexer 4 to the communications controller 5. This PCW is coupled over the data output lines 12 (FIG. 3) to the data output register 14 and is gated into register 14 by a $CON signal on line 13 from the input/output multiplexer. A register is adapted to provide temporary storage of data being processed or data or instructions being transferred between system components. The register comprises a plurality of flip-flops, one flip-flop for each bit of data to be stored therein. A register which can be used in the present invention is disclosed on pages 343–347 of the textbook, "Pulse, Digital and Switching Waveforms," by Millman and Taub, McGraw-Hill N.Y., N.Y. 1965.

The complete PCW comprising bits 0 through 35 is stored in register 14. Various portions of the PCW are coupled from the output lead of register 14 to the identification decoder or ID decoder 15, the operation decoder or OP decoder 16, the address decoder 17, the configuration register 19 and to the subchannel. Only bits 0 and 1 of the PCW are coupled to the ID decoder 15; bits 2–5 are coupled to the OP decoder 16; bits 7–11 are coupled to the address decoder 17; bits 12–17 are coupled to the configuration register 19 and bits 24–35 are coupled to the subchannel.

Bits 0 and 1 of the PCW are decoded by the ID decoder 15 into four signals labeled ID0–ID3. When the PCW has a binary zero in bits 0 and 1 the ID decoder supplies an output signal on the ID0 line 35. When a PCW has a binary 0 and 1 in the first two bits the ID decoder 15 supplies a signal on the ID1 line 29. In a similar manner when a binary 1 and 0 are present in the first two bits of a PCW a signal is present on the ID2 line 32 and when a binary 1 and 1 are present in the PCW a signal is provided on the ID3 line 34. The other decoders 16 and 17 decode bits on the lines connected to the decoders and provide a plurality of signals at the output leads in a similar manner. For example, decoder 16 uses bits 2–5 of the PCW to provide signals on lines 0–15. Lines 0–11 are coupled to command register 20 and lines 12–15 are coupled to the data output bus or DOBUS 23 which is connected to the subchannel shown in FIGS. 4*a* and 4*b*. A decoder of the type which may be used in the present invention is shown on pages 349–352 of the textbook, "Pulse, Digital, and Switching Waveforms" by Millman and Taub, McGraw-Hill, N.Y., N.Y. 1965.

When a PCW0 or a PCW1 is stored in the data output register 14 the ID decoder 15 supplies a signal which is coupled through OR-gate 24 to one lead of AND-gate 27. The $CON signal is delayed by delay circuit 30 and applied to the other input of AND-gate 27 thereby enabling gate 27 and supplying a pulse to the command register 20. The pulse applied to register 20 gates the binary signals on lines 0–11 from the OP decoder 16 into the command register 20. These binary bits are stored in register 20 and are coupled to control logic (not shown) in the data communication system. A portion of this control logic is shown in FIG. 8 of the copending patent application by James A. Kennedy et al, bearing Ser. No. 50,792 and entitled "Data Communications System." The binary bits stored in register 20 cause the control logic to perform a variety of functions such as store status, etc.

The address decoder 17 uses bits 7–11 of the PCW to decode the number of the subchannel which is to receive the control information contained in the PCW. Decoded signals from decoder 17 are coupled over line 18 as a control gate enable or CGE signal to the subchannel shown in FIGS. 4*a* and 4*b*. Only one line 18 is shown; however, it should be understood that there is a line from address decoder 17 to each of the subchannels in the data communication system.

When a PCW2 or a PCW3 is stored in the data output register 14 the bits 0 and 1 which are coupled to ID decoder 15 cause the decoder to provide an ID2 signal on line 32 or an ID3 signal on line 34 to OR-gate 25. When either an ID2 or an ID3 signal is received by gate 25 this signal is coupled through gate 25 to one lead of the AND-gate 28. The delay circuit 30 provides a delayed $CON signal to the other lead of gate 28 thereby enabling gate 28 and causing a pulse to be provided to configuration register 19 so that the bits 12–16 of the PCW are stored in register 19. Register 19 contains 5 flip-flops with each flip-flop storing one of the bits 12–16. Each of these bits 12–16 can be used to provide a signal such as SEND PARITY, RECEIVE PARITY, TABLE LOOK UP ENABLE, SELECT ONE OR TWO ICW's, etc., to one of the leads **21*a*–21*e*. These leads 21*a*–21*e*** may be connected to logic (not shown) in the communications controller.

Figure 3:
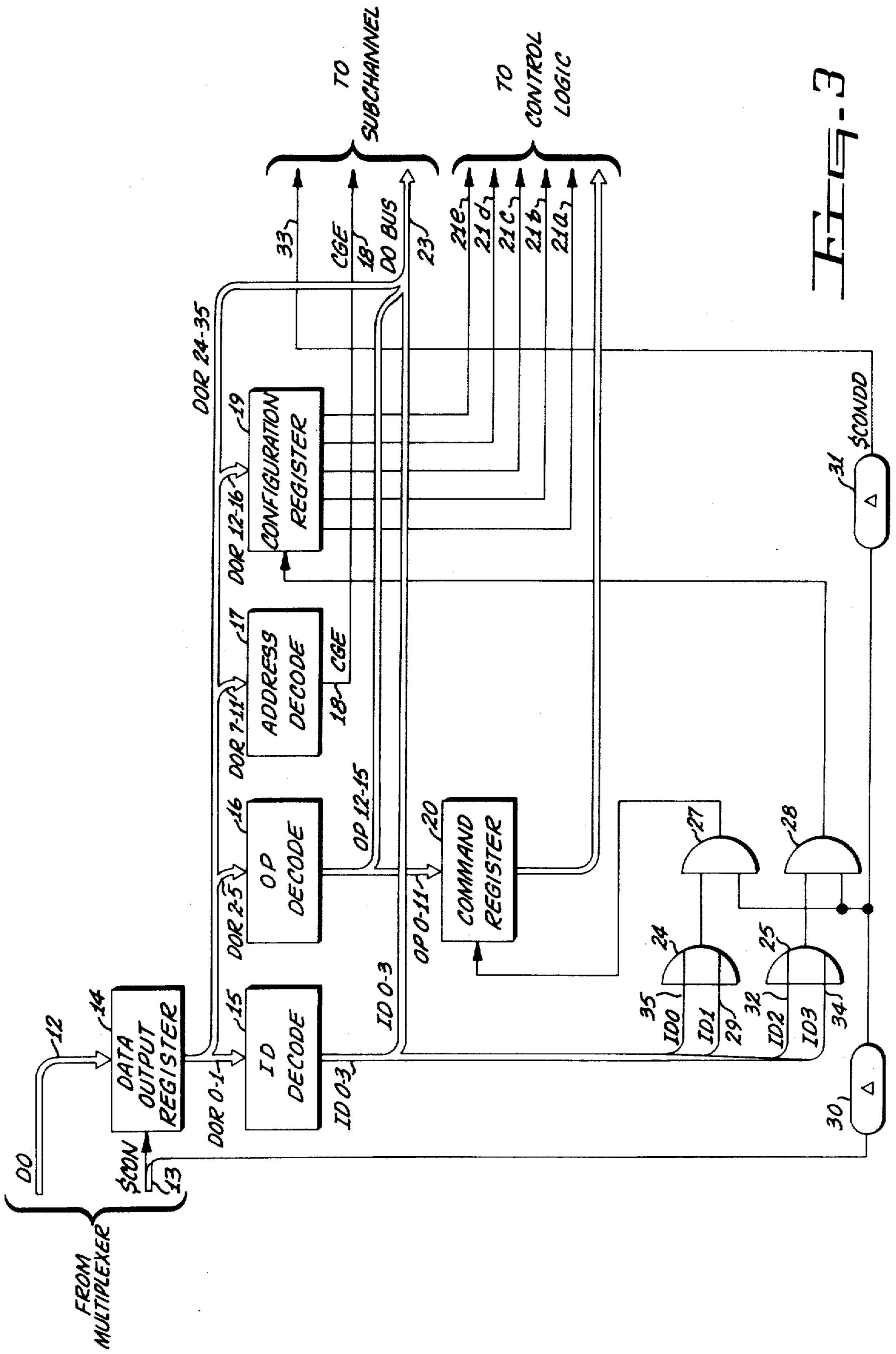
FIG. 3 is a simplified block diagram of a portion of the data communications controller which is constructed in accordance with teachings of the present invention.
Figure 4A:
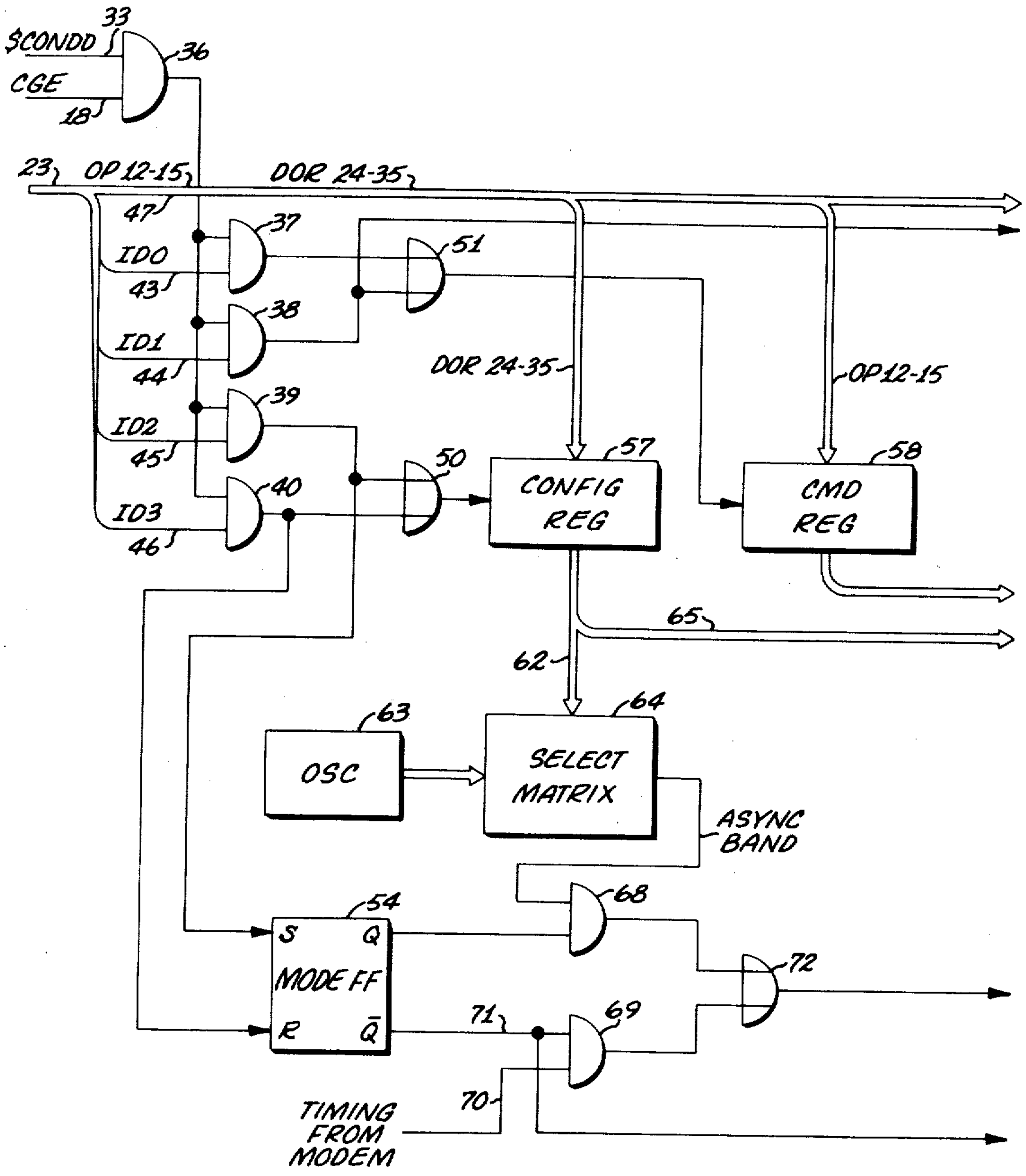
FIGS. 4*a* and 4*b* is a simplified block diagram of a portion of a communication controller subchannel constructed in accordance with teaching of the present invention.
Figure 4B:
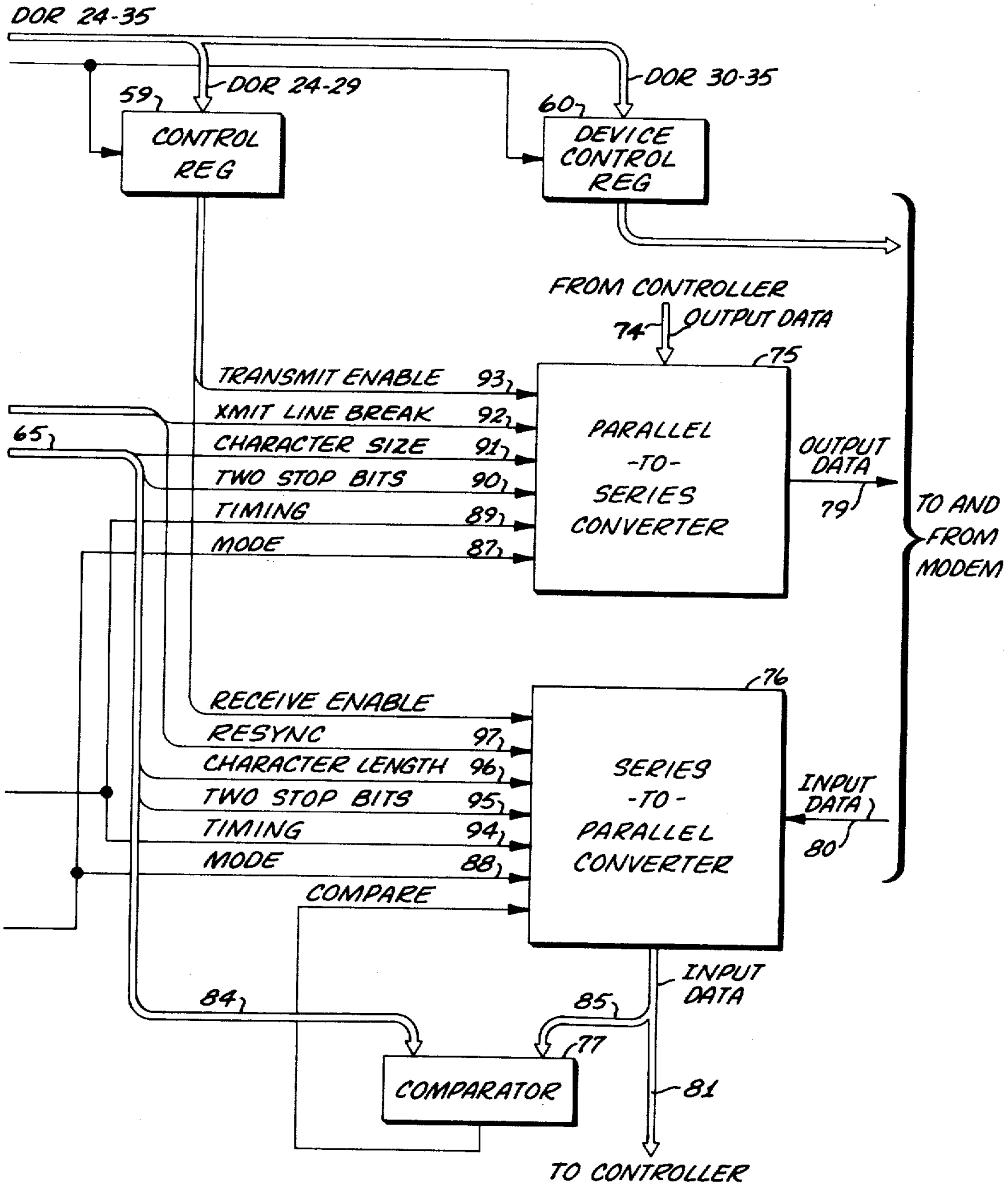

Signals developed by decoders 15, 16 and 17 and signals from the input/output multiplexer are coupled from the controller in FIG. 3 to the subchannel shown in FIGS. 4*a* and 4*b*. The CGE from decoder 17, the ID0–ID3 signals from decoder 15, the OP12–15 signals from decoder 16 and the DOR 24–35 signals from register 14 are coupled to the data output bus or DOBUS 23 which is connected to the sub-channel. DOBUS 23 comprises a cable having a plurality of leads with one lead for each of the binary bits from the decoders and registers.

The CGE signal on line 18 (FIG. 4*a*) and the delayed $CON signal on line 33 enable AND-gate 36 so that the signals on the DOBUS 23 will be gated through AND-gates 37, 38, 39 and 40 into the proper registers in the subchannel. When a PCW0 is stored in the controller an ID0 signal will be provided on line 43 which is connected to one lead of AND-gate 37. The ID0 signal and the signal from AND-gate 36 enable gate 37 so that the ID0 signal passes through OR-gate 51 and causes the OP 12–15 bits to be gated into the subchannel command register 58. When a PCW1 is stored in the controller the ID1 signal on line 44 and the signal from gate 36 enable AND-gate 38 so that the OP 12–15 bits are gated into sub-channel command register 58, the DOR 24–29 bits are gated into control register 59 and the DOR 30–35 bits are gated into the device control register 60. DOR bits 30–35 contain a plurality of control commands which are coupled through the modem to the terminal device. Control register 59 provides TRANSMIT ENABLE signals which turn on the parallel-to-series converter 75. Subchannel command register 58 and control register 59 provide RESYNC and RECEIVE ENABLE signals to series-to-parallel converter 76. The RECEIVE ENABLE signal turns on the converter 76.

When a PCW2 is stored in the controller an ID2 signal on line 45 and a signal from AND-gate 36 enable AND-gate 39 and provide a signal to gate the OP 12–15 and the DOR 24–35 signals into subchannel configuration register 57. This signal from AND-gate 39 also sets the mode flip-flop 54 so that a binary 1 is present at the 1-output lead thereby providing a signal to one lead of AND-gate 68. The binary bits stored in subchannel configuration register 57 provide a signal on lines 62 to the decoding or select matrix 64 thereby causing the matrix 64 to select one of the eight timing frequencies provided by oscillator 63 and to couple this timing frequency to the other lead of AND-gate 68. Gate 68 is enabled so that the selected timing frequency is coupled through the exclusive OR circuit 72 to the input of the Parallel-to-Series Converter 75, and to the Series-to-Parallel Converter 76. A select matrix of the type which may be used in the present invention is shown in FIG. 2 of a copending U.S. Pat. application by Ronald W. Blessin et al., filed Nov. 3, 1970, entitled "Data Communications Subchannel." A Parallel-to-Series Converter which may be used in the present invention is shown in FIG. 5 and a Series-to-Parallel Converter is shown in FIG. 4 of the same patent application. "Data Communications Subchannel."

A Parallel-to-Series Converter of the type shown receives several bits of data all at one time, on a plurality of input leads and transfers these bits one at a time, to an output lead. A Series-to-Parallel converter receives bits one at a time on an input lead and transfers these bits all at one time to a plurality of output leads.

An exclusive-OR circuit of the type shown provides a binary 1 at its output lead when a binary 1 is applied to one and only one of its two input leads. All other combinations of input signals cause the exclusive-OR circuit to provide a binary 0 at the output lead. An exclusive-OR of the type which may be used in the present invention is shown on pages 326–328 of the textbook "-Pulse, Digital, and Switching Waveforms" by Millman and Taub listed above.

When a PCW3 is used in the system an ID3 signal on line 46 applied to one lead of AND-gate 40 and the signal from AND-gate 36 applied to the other lead enable AND-gate 40 so that the ID3 signal passes through gate 40. The signal from AND-gate 40 causes mode flip-flop 54 to be set so that a binary 1 is present at the $\overline{Q}$ output terminal. The signal from AND-gate 40 is also coupled through OR-gate 50 to gate the OP 12–15 signals into register 58 and the DOR 24–35 signals into register 57. The binary 1 from the $\overline{Q}$-output lead of mode flip-flop 54 is coupled to lead 71 of AND-gate 69 and an external timing frequency from the terminal device being used is coupled to the lead 70 of AND-gate 69 so that gate 69 is enabled. The timing frequency from lead 70 is coupled through exclusive OR-gate 72 to the Parallel-to-Series Converter 75 and to the Series-to-Parallel converter 76. The binary bits stored in sub-channel configuration register 57 are coupled over line 65 to converter 75 and converter 76 to determine the length of the characters being used and to provide stop bits for the converters 75 and 76. The binary 1 from the mode flip-flop 54 is also coupled over lines 87 and 88 to the converters 75 and 76 to cause these converters to operate in the asynchronous mode.

Converter 75 comprises a shift register with line 74 from the communications controller connected to each of the bit positions in converter 75. Thus, the characters are put into the converter in the parallel form and shifted out over the output line 79 in serial form to the terminal device connected to line 79. The signals on the timing input line 89 determine the rate at which this information is shifted out over the output line 79 and the signals on line 92 determine the length of the characters that are being sent over line 79.

The converter 76 receives input data in bit serial form over line 80 from the terminal data and converts this information into parallel form in a register similar to the one in the converter 75. These binary bits are then placed in parallel on data output lines 81 and are sent to the communications controller. Signals on the clock input line 95 and on the character length line 97 are used to synchronize the incoming message characters and to convert them to parallel form in a manner well known in the art.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. In a data communication system having a processor, a memory having a plurality of peripheral control words, a communications controller and a terminal device, the combination comprising:

storage means in said controller;

means connected to said memory for selectively transferring a peripheral control word from said memory to said storage means in said controller, said means for transferring being coupled to said storage means;

means for using said peripheral control word to select a baud rate from a plurality of baud rates; and means for using said selected baud rate in transferring message characters between said controller and said terminal device, said means for using said peripheral control word and said means for using said selected baud rate being coupled to said storage means.

2. A data communication system as defined in claim 1 wherein said means for using said peripheral control word to select a baud rate includes:

an oscillator which develops a plurality of frequencies; and means connected to said oscillator for using said peripheral control word to select a frequency from the plurality of frequencies.

3. In a data communication system having a processor, a memory having a plurality of peripheral control words, a communications controller and a terminal device, the combination comprising:

storage means in said controller;

means connected to said memory for selectively transferring a peripheral control word from said memory to said storage means in said controller, said means for transferring being coupled to said storage means; and means for using said peripheral control word to select the length of message characters which can be transferred between said controller and said terminal device, said means for using said peripheral control word being coupled to said storage means.

4. The combination as defined in claim 3 including:

means connected to said storage means for using said peripheral control word to select a baud rate from a plurality of baud rates and means for using said selected baud rate in transferring message characters between said controller and said terminal device.

5. In a data communication system having a processor, a memory having a plurality of peripheral control words, a communications controller and a terminal device, the combination comprising:

storage means in said controller;

means connected to said memory for selectively transferring a peripheral control word from said memory to said storage means in said controller, said means for transferring being coupled to said storage means; and means for using said peripheral control word to select the mode of transferring message characters between said controller and said terminal device, said means for using said peripheral control word being coupled to said storage means.

6. In a data communication system having a processor, a memory having a plurality of peripheral control words, a communications controller and a terminal device, the combination comprising:

storage means in said controller;

means connected to said memory for selectively transferring a peripheral control word from said memory to said storage means in said controller, said means for transferring being coupled to said storage means; and means for using said peripheral control word to select the number of stop bits in a message character when said controller is operating in an asynchronous mode, said means for using said peripheral control word being coupled to said storage means.

7. The combination as defined in claim 6 including:

means connected to said storage means for using said peripheral control word to select the baud rate of message characters being transferred between said controller and said terminal device.

8. In a data communication system having a processor, a memory having a plurality of peripheral control words, a communications controller and a terminal device, the combination comprising:

storage means in said controller;

means connected to said memory for selectively transferring a peripheral control word from said memory to said storage means in said controller, said means for transferring being coupled to said storage means; and means for using said peripheral control word to define the synchronizing character used by said communication system when said controller is operating in a synchronous mode, said means for using said peripheral control word being coupled to said storage means.

9. In a data communication system having a processor, a memory having a plurality of peripheral control words, a communications controller and a terminal device, the combination comprising:

storage means in said controller;

means connected to said memory for selectively transferring a peripheral control word from said memory to said storage means in said controller, said means for transferring being coupled to said storage means; and means for using said peripheral control word to generate parity used in checking message characters sent by said controller to said terminal device.

10. In a data communication system having a processor, a memory having a plurality of peripheral control words, a communications controller and a terminal device, the combination comprising:

storage means in said controller;

means connected to said memory for selectively transferring a peripheral control word from said memory to said storage means in said controller, said means for transferring being coupled to said storage means; and means for using said peripheral control word to selectively check parity of message characters received by said controller from said terminal device, said means for using said peripheral control word being coupled to said storage means.

11. In a data communication system having a processor, a memory having a plurality of peripheral control words, a communications controller and a terminal device, the combination comprising:

storage means in said controller;

means connected to said memory for selectively transferring a peripheral control word from said memory to said storage means in said controller, said means for transferring being coupled to said storage means; and means for using said peripheral control word to select the mode of operation, to select the length of message characters used, to determine if parity is generated and to select the baud rate used, said means for using said peripheral control word being coupled to said storage means.

* * * * *